(12) United States Patent
Thorne et al.

(10) Patent No.: US 11,458,771 B2
(45) Date of Patent: Oct. 4, 2022

(54) WHEELS HAVING SHOCK ABSORBING CHARACTERISTICS AND A SURFACE TREATMENT APPARATUS USING THE SAME

(71) Applicant: SharkNinja Operating, LLC, Needham, MA (US)

(72) Inventors: Jason B. Thorne, Dover, MA (US); Pu Zhou, Bedford, MA (US); Ming Yao, Suzhou (CN); Gordon Howes, Suzhou (CN)

(73) Assignee: SharkNinja Operating LLC, Needham, MA (US)

( * ) Notice: Subject to any disclaimer, the term of this patent is extended or adjusted under 35 U.S.C. 154(b) by 917 days.

(21) Appl. No.: 16/117,934

(22) Filed: Aug. 30, 2018

(65) Prior Publication Data
US 2019/0059668 A1 Feb. 28, 2019

Related U.S. Application Data

(60) Provisional application No. 62/553,036, filed on Aug. 31, 2017.

(51) Int. Cl.
*B60C 7/14* (2006.01)
*A47L 9/00* (2006.01)
(Continued)

(52) U.S. Cl.
CPC ...... *B60C 7/14* (2013.01); *A47L 5/28* (2013.01); *A47L 9/009* (2013.01); *B60B 9/04* (2013.01)

(58) Field of Classification Search
CPC ..... B60B 9/04; B60B 9/26; A47L 5/28; A47L 9/009; B60C 7/14; B60C 7/143; B60C 2007/146
See application file for complete search history.

(56) References Cited

U.S. PATENT DOCUMENTS 1,136,868 A * 4/1915 Doll .......................... B60B 9/26
152/96
4,138,762 A 2/1979 Jost et al.
(Continued)

FOREIGN PATENT DOCUMENTS

DE 102010017211 A1 12/2011
DE 102010017258 A1 12/2011
(Continued)

OTHER PUBLICATIONS

"Mars Exploration Rover Mission: Spotlight", https://mars.nasa.gov/mer/spotlight/wheels01.html, Wheels in the Sky, May 30, 2003, 2 pgs.
(Continued)

*Primary Examiner* — S. Joseph Morano
*Assistant Examiner* — Emily G. Castonguay
(74) *Attorney, Agent, or Firm* — Grossman Tucker Perreault & Pfleger, PLLC

(57) ABSTRACT

A vacuum cleaner can include an upright section, a surface cleaning head coupled to the upright section, and at least one wheel coupled to the surface cleaning head. The at least one wheel can include a hub, a rim, and an absorber. The absorber can extend between the hub and the rim. The absorber can be configured to deform before the rim experiences substantial deformation. A deformation limiter can be provided that is configured to limit the deformation in the absorber.

6 Claims, 6 Drawing Sheets

(51) Int. Cl.
A47L 5/28 (2006.01)
B60B 9/04 (2006.01)

(56) References Cited

U.S. PATENT DOCUMENTS

| | | | |
|---|---|---|---|
| 5,125,443 A * | 6/1992 | Schwartzman | B60B 9/26 |
| | | | 152/69 |
| D348,548 S | 7/1994 | Pino | |
| 5,960,514 A | 10/1999 | Miller et al. | |
| 6,012,200 A | 1/2000 | Murphy et al. | |
| 6,226,832 B1 | 5/2001 | McCormick | |
| 6,237,188 B1 | 5/2001 | Takemoto et al. | |
| D473,687 S | 4/2003 | Kaffenberger | |
| D510,465 S | 10/2005 | Takahashi et al. | |
| D524,498 S | 7/2006 | Luebbering et al. | |
| 7,171,723 B2 | 2/2007 | Kobayashi et al. | |
| 7,200,893 B2 | 4/2007 | Gerber et al. | |
| 7,329,294 B2 | 2/2008 | Conrad | |
| 7,523,773 B2 * | 4/2009 | Gabrys | B60B 7/0086 |
| | | | 152/69 |
| D594,612 S | 6/2009 | Umeda | |
| D597,268 S | 7/2009 | Santiago et al. | |
| 7,690,079 B2 | 4/2010 | Boddy et al. | |
| D619,315 S | 7/2010 | Ayers | |
| 7,979,952 B2 | 7/2011 | Beskow et al. | |
| 8,032,983 B2 | 10/2011 | Griffith et al. | |
| D668,019 S | 9/2012 | Stickney et al. | |
| 8,402,600 B2 | 3/2013 | Beskow et al. | |
| 8,402,601 B2 | 3/2013 | Fahlstrom | |
| D685,961 S | 7/2013 | Bilger et al. | |
| 8,631,541 B2 | 1/2014 | Tran | |
| 8,745,818 B2 | 6/2014 | Iles et al. | |
| 8,776,311 B2 | 7/2014 | Genn et al. | |
| D720,104 S | 12/2014 | Santiago et al. | |
| D731,130 S | 6/2015 | Dyson et al. | |
| D731,134 S | 6/2015 | Dyson et al. | |
| D731,136 S | 6/2015 | Yun et al. | |
| 9,066,640 B2 | 6/2015 | Iles et al. | |
| D738,583 S | 9/2015 | Gidwell et al. | |
| D738,584 S | 9/2015 | Niedzwecki | |
| 9,119,511 B2 | 9/2015 | Kah, Jr. | |
| 9,144,356 B2 | 9/2015 | Yun | |
| 9,314,140 B2 | 4/2016 | Eriksson | |
| D761,507 S | 7/2016 | Heck et al. | |
| D762,031 S | 7/2016 | Niedzwecki | |
| 9,427,122 B2 | 8/2016 | Conrad et al. | |
| 9,451,853 B2 | 9/2016 | Conrad et al. | |
| 9,451,855 B2 | 9/2016 | Conrad | |
| 9,468,346 B1 | 10/2016 | Rzepka | |
| D773,139 S | 11/2016 | Palladino | |
| D774,264 S | 12/2016 | Bartram et al. | |
| D779,751 S | 2/2017 | Chu | |
| D779,752 S | 2/2017 | Johnson | |
| D781,014 S | 3/2017 | Wu et al. | |
| D788,393 S | 5/2017 | Canas et al. | |
| D790,785 S | 6/2017 | Courtney et al. | |
| D796,136 S | 8/2017 | Reynolds et al. | |
| 10,390,669 B2 | 8/2019 | Kim | |
| 10,500,894 B2 | 12/2019 | Park et al. | |
| 2002/0124334 A1 | 9/2002 | Worwag | |
| 2005/0172447 A1 | 8/2005 | Roney et al. | |
| 2006/0191097 A1 | 8/2006 | Baumhakel | |
| 2009/0229075 A1 | 9/2009 | Eriksson | |
| 2010/0107359 A1 | 5/2010 | Too | |
| 2012/0311813 A1 | 12/2012 | Duane, Jr. et al. | |
| 2013/0139349 A1 | 6/2013 | Iles et al. | |
| 2014/0196247 A1 | 7/2014 | Kasper et al. | |
| 2014/0237760 A1 | 8/2014 | Conrad | |
| 2015/0033498 A1 | 2/2015 | McVey | |
| 2015/0135474 A1 * | 5/2015 | Gidwell | A47L 5/26 |
| | | | 15/323 |
| 2015/0289735 A1 | 10/2015 | Van Der Kooi et al. | |
| 2015/0359396 A1 | 12/2015 | Yun | |
| 2016/0058257 A1 | 3/2016 | Ventress et al. | |
| 2016/0345795 A1 | 12/2016 | Manning | |
| 2017/0347848 A1 | 12/2017 | Carter et al. | |

FOREIGN PATENT DOCUMENTS

| | | | | |
|---|---|---|---|---|
| EM | 003404540001 | 10/2015 | | |
| EP | 1994869 | 11/2008 | | |
| EP | 2543301 | 9/2013 | | |
| EP | 2436292 B1 * | 12/2013 | | A47L 9/009 |
| GB | 191016170 A * | 5/1911 | | B60B 9/26 |
| GB | 360577 A | 11/1931 | | |
| GB | 2109224 | 6/1983 | | |
| GB | 2285777 A | 7/1995 | | |
| GB | 2476811 | 7/2011 | | |
| GB | 2529819 | 9/2016 | | |
| JP | 03228721 A | 10/1991 | | |
| JP | 05228083 A | 9/1993 | | |
| JP | 2639155 B2 | 8/1997 | | |
| JP | H10201682 A | 8/1998 | | |
| JP | H11187997 A | 7/1999 | | |
| JP | 2004222912 A | 8/2004 | | |
| JP | 2006247229 A | 9/2006 | | |
| JP | 2006312066 A | 11/2006 | | |
| JP | 10003314 | 8/2010 | | |
| KR | 100593324 B1 | 6/2006 | | |
| WO | 9210967 A1 | 7/1992 | | |
| WO | 2009117383 | 9/2009 | | |
| WO | 2011083294 A1 | 7/2011 | | |
| WO | 2014131106 A1 | 9/2014 | | |
| WO | 2014177216 | 11/2014 | | |
| WO | 2015015166 | 2/2015 | | |
| WO | 2015015167 | 2/2015 | | |
| WO | 2016034848 | 3/2016 | | |

OTHER PUBLICATIONS

International Search Report and Written Opinion dated Mar. 17, 2017 in corresponding PCT Patent Application No. PCT/US 16/58155, 12 pgs.
International Search Report and Written Opinion dated Mar. 24, 2017 in corresponding PCT Patent Application No. PCT/US 16/58148, 14 pgs.
International Search Report and Written Opinion dated Jul. 18, 2018 in corresponding PCT Patent Application No. PCT/US18/28635, 16 pgs.
International Search Report and Written Opinion dated Dec. 26, 2018 in corresponding PCT Patent Application No. PCT/US18/47525, 14 pgs.
International Search Report and Written Opinion dated Aug. 23, 2018 in corresponding PCT Patent Application No. PCT/US18/34320, 11 pgs.
English translation of Japanese Office Action dated May 21, 2019, received in Japanese Application No. 2018-520541, 11 pgs.
English translation of Korean Office Action dated May 31, 2019, received in Korean Application No. 10-2018-7014186, 8 pgs.
Extended European Search Report dated Apr. 3, 2019, received in EP Application No. 16858308.6, 7 pgs.
English translation of Japanese Office Action dated Apr. 1, 2019, received in Japanese Application No. 2017-557189, 6 pgs.
"Shark Rocket Ulra-Light Upright (HV301)", https://www.amazon.com/Shark-Rocket-Ultra-Light-Upright-HV301, Oct. 31, 2018.
"Shark HV322 TruePat Rocket Ultra-Lightweight Upright Vacuum", https://www.amazon.com/Shark-HV322-TruePet-Ultra-Lightweight-Upright, Oct. 31, 2018.
Australian Examination Report dated Oct. 23, 2018, received in AU Application No. 2016341998, 5 pgs.
Australian Examination Report dated Oct. 16, 2018, received in AU Application No. 2016342001, 5 pgs.

* cited by examiner

WHEELS HAVING SHOCK ABSORBING CHARACTERISTICS AND A SURFACE TREATMENT APPARATUS USING THE SAME

CROSS-REFERENCE TO RELATED APPLICATIONS

The present application claims the benefit of U.S. Provisional Application Ser. No. 62/553,036 filed on Aug. 31, 2017, entitled Anti-Shock Wheels for Vacuum Cleaners, which is fully incorporated herein by reference.

TECHNICAL FIELD

This specification relates generally to surface treatment apparatuses, and more specifically to wheels having shock absorbing characteristics that are configured to be used with a surface treatment apparatus such as a vacuum cleaner.

BACKGROUND INFORMATION

Surface treatment apparatuses are configured to maneuver over a surface to be cleaned (e.g., a floor) in order to, for example, remove debris from the surface to be cleaned. For example, the surface treatment apparatus may include a plurality of wheels configured to rotate as the surface treatment apparatus travels over the surface to be cleaned. The wheels can be configured to be rigid such that the weight of the surface treatment apparatus is supported by the wheels without deformation. However, when a rigid wheel encounters an obstacle on a surface to be cleaned (e.g., a threshold between rooms), the impact may be transmitted to an operator of the surface treatment apparatus. This may result in increased operator fatigue and/or discomfort.

BRIEF DESCRIPTION OF THE DRAWINGS

These and other features advantages will be better understood by reading the following detailed description, taken together with the drawings wherein.

DETAILED DESCRIPTION

The present disclosure is generally directed to a surface treatment apparatus having at least one wheel coupled to a surface cleaning head. The at least one wheel can include a hub and a rim spaced apart from the hub by a separation distance. An absorber (e.g., a plurality of arcuate spokes) can extend between the hub and the rim. The absorber can be configured to be resiliently deformable in response to the wheel encountering an obstacle (e.g., a threshold between rooms). The rim can be configured to be more rigid than the absorber such that the rim does not substantially deform in response to contacting the obstacle. In other words, the rim can be configured such that it moves relative to the hub in response to contacting the obstacle. Such a configuration may reduce operator fatigue and/or discomfort by reducing the transmission of impact forces through the surface cleaning apparatus. In some instances, such a configuration may reduce a quantity of noise generated by the surface treatment apparatus when it encounters an obstacle. Therefore, the wheels may generally be described as being shock absorbing.

As generally referred to herein, the term resiliently deformable may refer to an ability of a mechanical component to repeatably transition between an un-deformed and a deformed state (e.g., transition between the un-deformed and deformed state at least 100 times, 1,000 times, 100,000 times, 1,000,000 times, 10,000,000 times, or any other suitable number of times) without the component experiencing a mechanical failure (e.g., the component is no longer able to function as intended).

Figure 1:
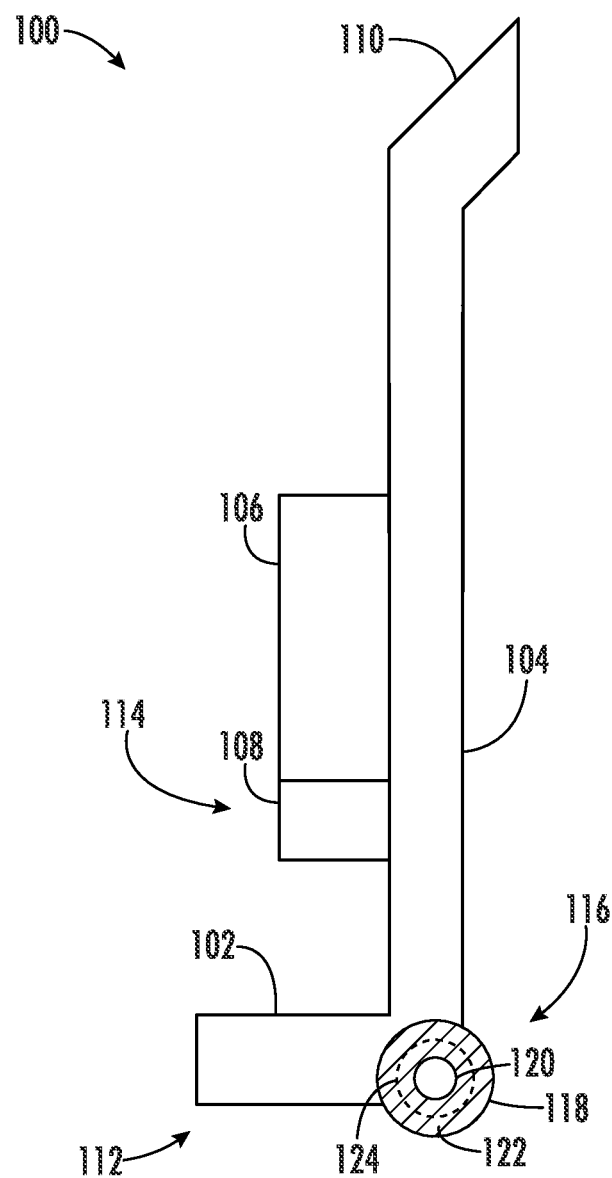
FIG. 1 is a schematic view of an upright vacuum cleaner, consistent with embodiments of the present disclosure.

FIG. 1 shows a schematic example of a vacuum cleaner 100, consistent with embodiments of the present disclosure. As shown, the vacuum cleaner 100 includes a surface cleaning head 102, an upright section 104, a dust cup 106, a suction motor 108, and a handle 110. The suction motor 108 is configured to draw air in through an inlet 112 of the surface cleaning head 102 and into the dust cup 106. As the air passes through the dust cup 106 at least a portion of any debris entrained within the air is deposited in the dust cup 106. After passing through the dust cup 106 the air enters the suction motor 108 and is exhausted from the suction motor 108 via an outlet 114.

As shown, the surface cleaning head 102 is coupled to the upright section 104 and includes at least one wheel 116. The wheel 116 may include a rim 118, a hub 120, and an absorber 122 that extends between the rim 118 and the hub 120. The absorber 122 is configured such that rim 118 is displaceable relative to the hub 120. In other words, the absorber 122 is configured to absorb at least a portion of any energy generated when the wheel 116 engages an obstacle (e.g., a threshold between rooms) by deforming such that the rim 118 can be displaced relative to the hub 120 without the rim 118 substantially deforming. As such, the absorber 122 can generally be described as being more flexible than the rim 118.

A deformation limiter 124 that is configured to limit the displacement of the rim 118 relative to the hub 120 can be provided. The deformation limiter 124 can be configured to limit the amount of deformation experienced by the absorber 122. For example, the deformation limiter 124 can be configured to prevent the permanent deformation of the absorber 122.

Figure 2:
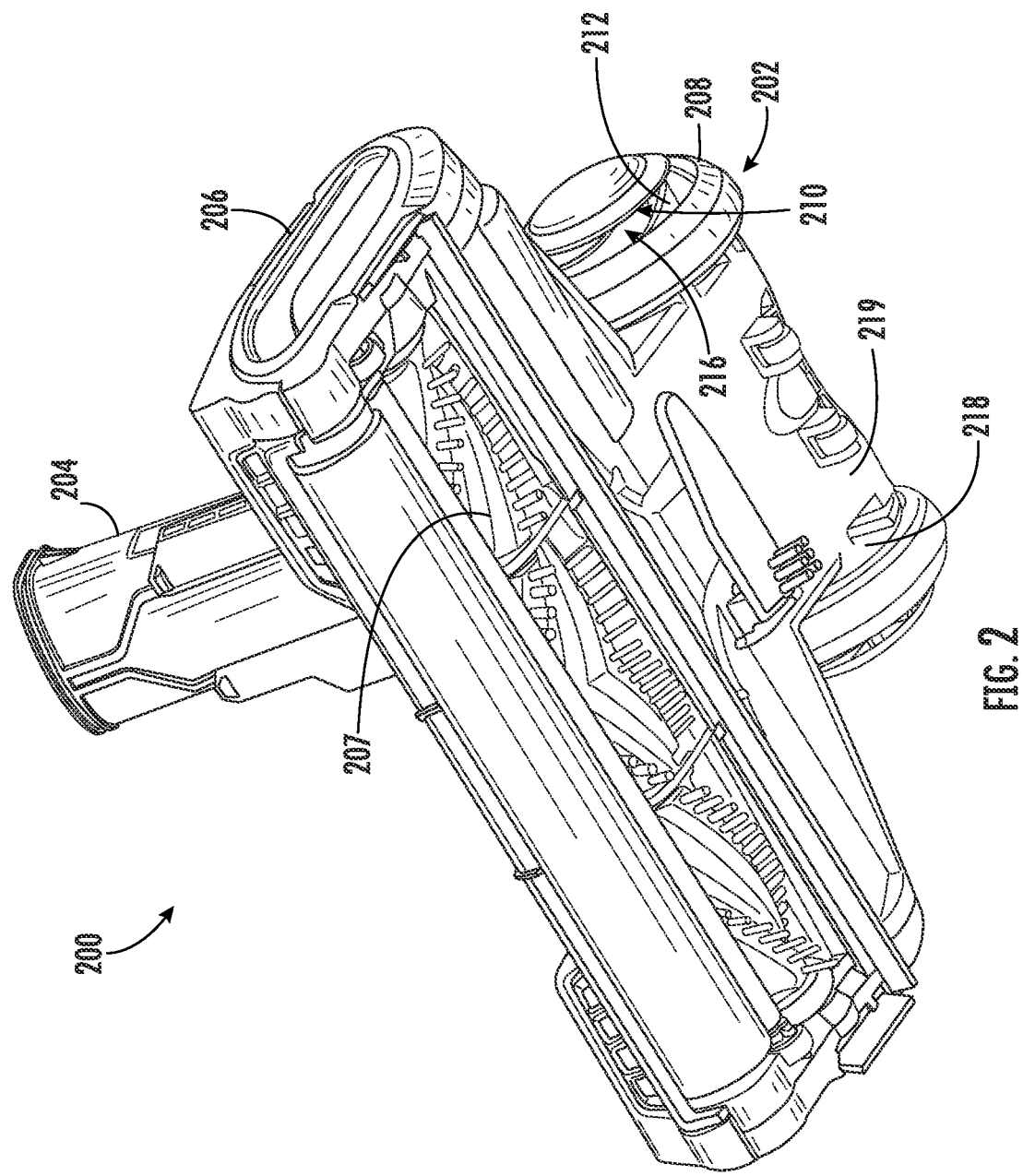
FIG. 2 is a perspective view of a surface cleaning head configured to be used with an upright vacuum cleaner, consistent with embodiments of the present disclosure.

FIG. 2 shows a perspective view of a surface cleaning head 200, which may be an example of the surface cleaning head 102 of FIG. 1. As shown, the surface cleaning head 200 includes a plurality of wheels 202 disposed on opposing sides of the surface cleaning head 200, a neck 204 configured to receive, for example, a wand such that the neck 204 and wand collectively define at least a portion of an upright section, and a surface treatment assembly 206 configured to receive, for example, one or more agitators 207 (e.g., brush rolls).

As shown, each of the wheels 202 include a rim 208, a hub 210, and a plurality of spokes 212 extending between the rim 208 and the hub 210. The spokes 212 can be resiliently deformable such that when the rim 208 encounters an obstacle (e.g., a threshold between rooms) the spokes 212 deform such that the rim 208 moves relative to the hub 210. As such, the spokes 212 can generally be described as being more flexible than the rim 208.

As also shown, the spokes 212 have a generally arcuate shape that extends around at least a portion of the hub 210. A radius of curvature of the spokes 212 can increase as the spokes 212 extend around at least a portion of the hub 210 in a clockwise or counter clockwise direction. For example, the radius of curvature can increase as the spokes 212 extend around the hub 210 such that a convex surface 216 of the spokes 212 faces a direction of rotation of the wheels 202 when the surface cleaning head 200 is moved in a forward direction.

A deformation limiter 218 can be provided (e.g., the deformation limiter 218 may coupled to or formed from a main body 219 of the surface cleaning head 200) to limit the amount of deformation experienced by the spokes 212. For example, the deformation limiter 218 can be configured such that the deformation experienced by the spokes 212 remains elastic (or temporary). In other words, the deformation limiter 218 is configured to prevent and/or otherwise mitigate permanent deformation within the spokes 212. The spokes 212 can be deformed, for example, in response to the wheels 202 engaging (e.g., contacting) an obstacle, due to the natural weight of the surface cleaning apparatus, and/or other deformation sources.

Figure 3:
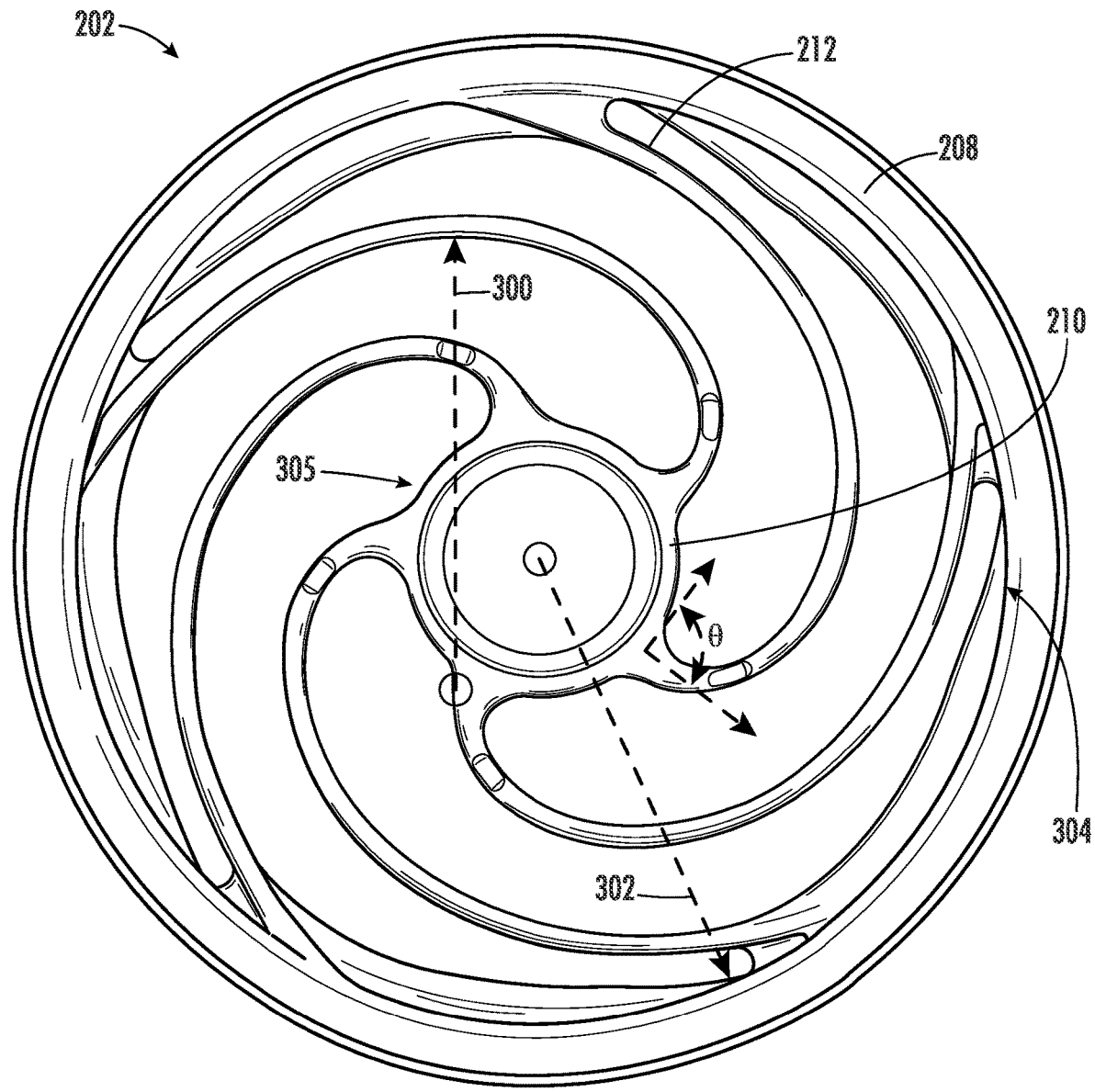
FIG. 3 is a side view of an example of a wheel capable of being used with the surface cleaning head of FIG. 2, consistent with embodiments of the present disclosure.

FIG. 3 shows a side view of the wheel 202. As shown, the spokes 212 extend from an outer surface 305 of the hub 210 in a direction of the rim 208. One or more of the spokes 212 can extend from the hub 210 at an angle θ such that a centerline of a respective spoke 212 is transverse to the outer surface 305 of the hub 210. For example, one or more of the spokes 212 can extend at a substantially perpendicular angle (e.g., at an angle between 80° and 100°) from the outer surface 305 of the hub 210. Additionally, or alternatively, one or more of the spokes 212 can extend from the outer surface 305 of the hub 210 such that at least a portion of the spokes 212 extend tangent to the outer surface 305.

As also shown, each spoke 212 has a radius of curvature 300 that increases as the spoke 212 extends around a rotation axis of the hub 210. For example, the radius of curvature 300 can be configured to increase until it is substantially equal to a radius 302 of the wheel 202. The rate at which the radius of curvature 300 increases can be constant or non-constant. For example, the radius of curvature 300 can increase linearly, exponentially, logarithmically, and/or at any other rate.

In some instances, the radius of curvature 300 can increase until at least a portion of one or more of the spokes 212 extends substantially tangent to an inner surface 304 of the rim 208. Additionally, or alternatively, one or more of the spokes 212 may not extend substantially tangent to the inner surface 304.

The spokes 212 are configured to be more flexible than the rim 208 such that the rim 208 can be displaced relative to the hub 210 without substantial deformation of the rim 208. In other words, the rim 208 is configured to remain substantially circular in cross-section when the wheel 202 encounters an obstacle. In some instances, the spokes 212 can generally be described as biasing the rim 208 to be substantially centered relative to the hub 210.

When the rim 208 is displaced relative to the hub 210 at least a portion of the spokes 212 are configured to be compressed towards the hub 210 and at least a portion of the spokes 212 are configured to be extended in a direction away from the hub 210. In other words, displacement of the rim 208 relative to the hub 210 causes the spokes to deform (e.g., flex) to absorb at least a portion of the energy generated as a result of the rim 208 contacting an obstacle.

Figure 4:
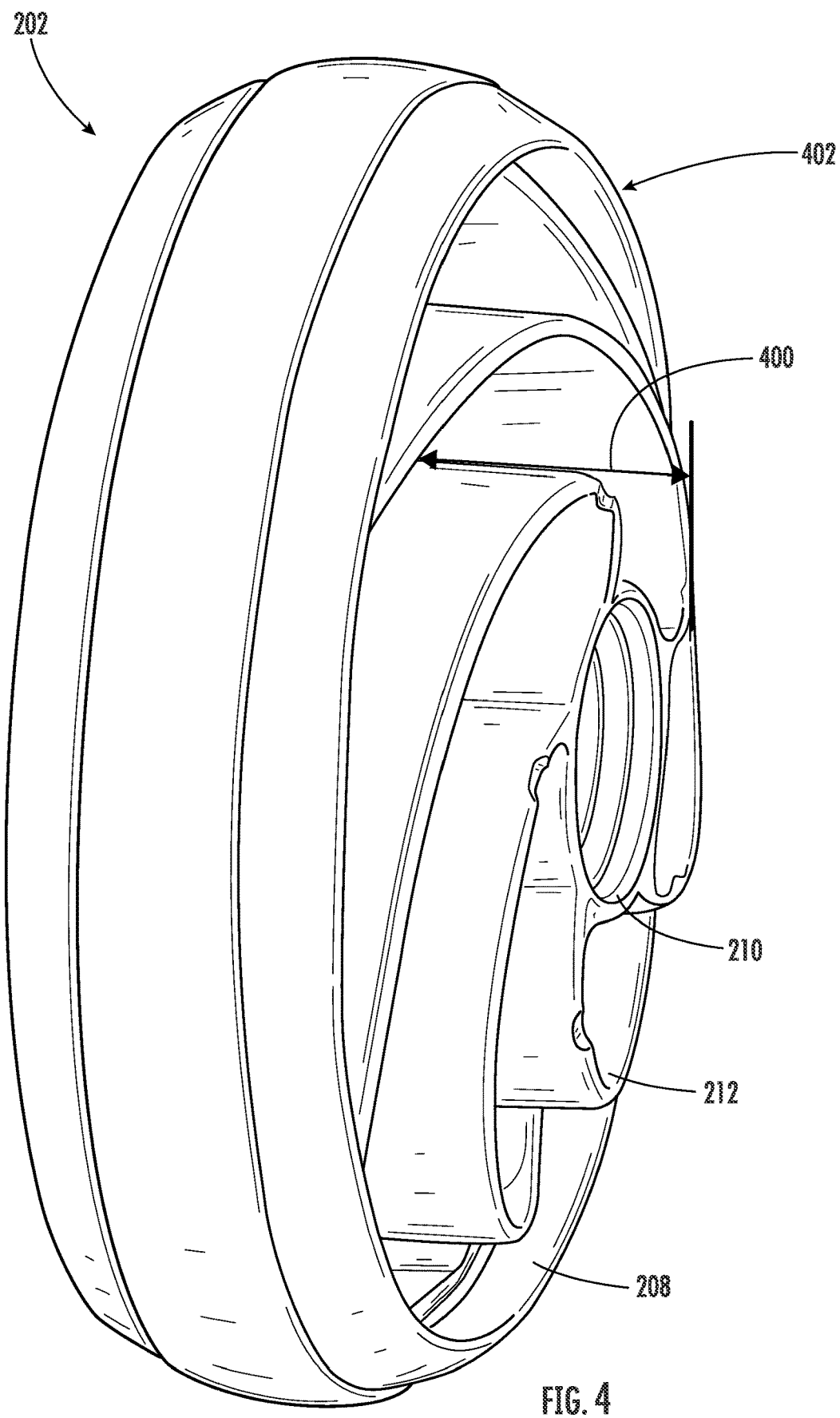
FIG. 4 is a perspective view of the wheel of FIG. 3, consistent with embodiments of the present disclosure.

FIG. 4 shows a perspective front view of the wheel 202. As shown, a measure of a width 400 of one or more of the spokes 212 can decrease as a measure of the radius of curvature 300 increases. In other words, the width 400 may be inversely related to the radius of curvature 300. Therefore, the spokes 212 can generally be described as initially increasing in flexibility as the spokes 212 extend from the hub 210, reaching a peak flexibility at a location between the hub 210 and the rim 208, before decreasing in flexibility as the spokes 212 approach the rim 208. Therefore, the flexibility of the spokes 212 can be based, at least in part, on the width 400 and the radius of curvature 300.

For example, and as shown, the width 400 may measure the greatest at a location adjacent the hub 210 and the radius of curvature 300 may measure the smallest at a location adjacent the hub 210. This configuration may result in improved resistance to a twisting motion such that a rotation axis of the hub 210 remains substantially parallel to a rotation axis of the rim 208. Further, this configuration may increase the strength of the connection between the spokes 212 and the hub 210.

As shown, at least a portion of one or more of the spokes 212 can extend beyond a peripheral edge 402 of the rim 208. When the spokes 212 extend beyond the peripheral edge 402, the rigidity of the spokes 212 may be increased. As such, the spokes 212 may be subject to less deformation due to the weight of an upright cleaner and/or more resistant to a twisting motion. In other instances, the spokes 212 may not extend beyond the peripheral edge 402 of the rim 208. This may increase the flexibility of the spokes 212. In some instances, at least one of the spokes 212 may extend beyond a peripheral edge 402 of the rim 208 and at least one of the spokes 212 may not extend beyond the peripheral edge 402.

Figure 5:
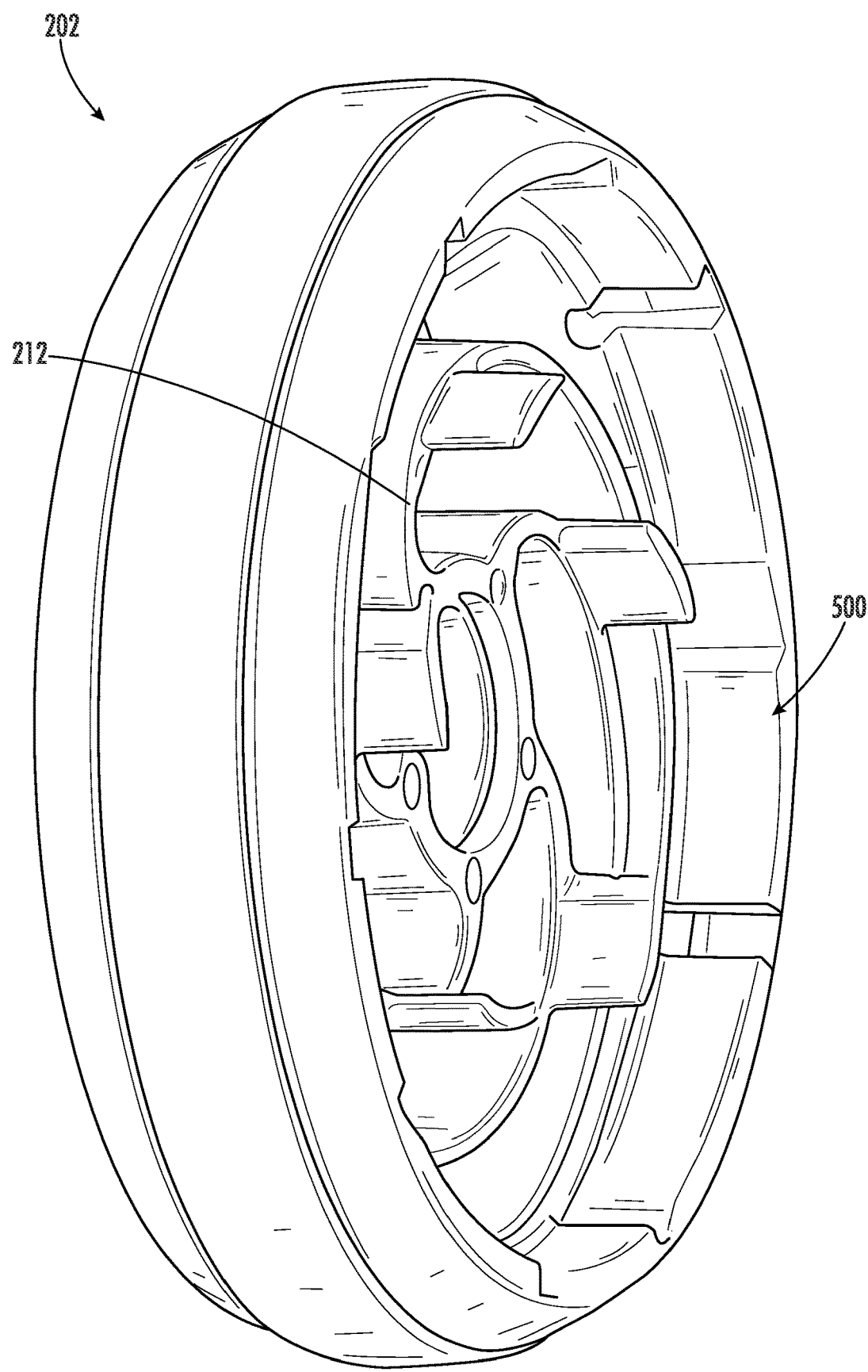
FIG. 5 is another perspective view of the wheel of FIG. 3, consistent with embodiments of the present disclosure.

FIG. 5 shows a perspective rear view of the wheel 202. As shown, the spokes 212 can extend only partially through the wheel 202 such that a receptacle 500 is defined within at least a portion of the wheel 202. In other words, at least a portion of the rim 208, hub 210, and spokes 212 may define the receptacle 500. The receptacle 500 can be configured to receive, for example, at least a portion of the surface cleaning head 200, the deformation limiter 218, and/or a connector configured to couple the wheel 202 to the surface cleaning head 200.

Figure 6:
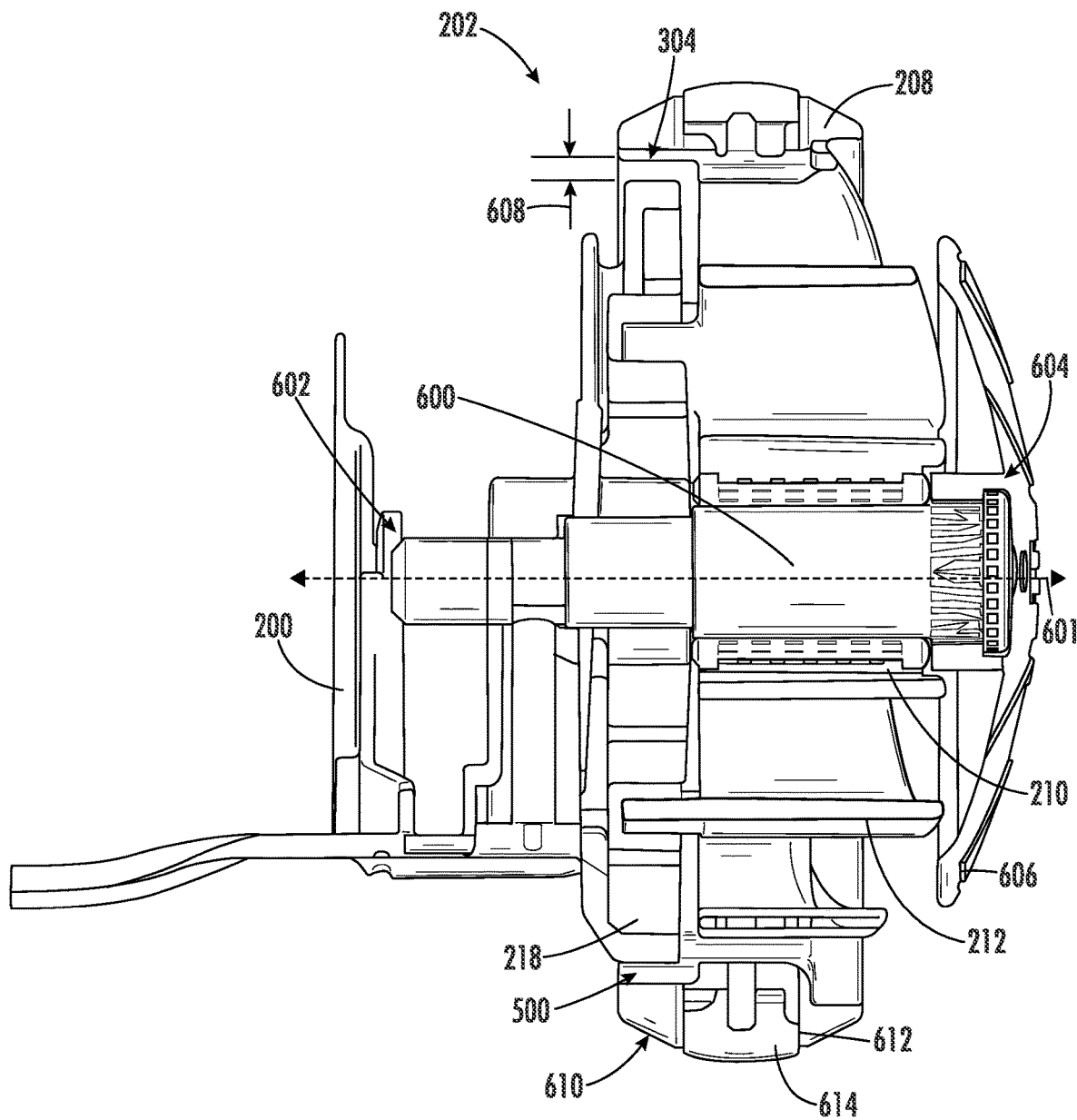
FIG. 6 is a cross-sectional view of the wheel of FIG. 3, consistent with embodiments of the present disclosure.

FIG. 6 shows a cross-sectional view of the wheel 202 coupled to a portion of a surface cleaning head 200. As shown, an axle 600 extends through a central portion of the hub 210 such that the wheel 202 can rotate about a rotation axis 601 defined by the axle 600. The axle 600 can include a first distal end 602 configured to be coupled to the surface cleaning head 200 and a second distal end 604 that is disposed opposite the first distal end 602. The second distal end 604 can include a wheel guard 606 coupled thereto to cover at least a portion of the spokes 212. The wheel guard 606 may prevent debris, obstacles, and/or other objects from entering the volume defined between the spokes 212. In some instances, the axle 600 can be configured to extend through the surface cleaning head 200 such at least two wheels 202 are coupled to the axle 600. In these instances, the first and second distal ends 602 and 604 can include a respective wheel guard 606.

The wheel 202 can be configured to rotate with the axle 600. For example, the wheel 202 may be coupled to the axle 600 using one of more of adhesives, mechanical fasteners (e.g., one or more screws, bolts, and/or any other mechanical fastener), press-fits, and/or any other form of coupling. In some instances, the wheel 202 may be configured to rotate relative to the axle 600. For example, the hub 210 can include and/or define a bearing/bearing surface such that the hub 210 can to rotate relative to the axle 600.

As shown, the deformation limiter 218 can extend around the axle 600 and be disposed at least partially within the receptacle 500 such that the deformation limiter 218 is spaced apart from the inner surface 304 of the rim 208 by a separation distance 608. The separation distance 608 can be based on the material properties of the spokes 212. For example, the separation distance 608 may be based on the yield strength of the material forming the spokes 212 (i.e., the point at which the deformation transitions from being elastic deformation to permanent deformation).

Therefore, the deformation limiter 218 may prevent the spokes 212 from undergoing permanent deformation when the wheel 202 encounters an obstacle. Similarly, the deformation limiter 218 may prevent permanent deformation when the wheel 202 experiences a significant impact (e.g., when the upright cleaner is inadvertently dropped).

The deformation limiter 218 can also be configured to reduce and/or otherwise mitigate the effects of creep deformation (e.g., deformation caused as a result of the wheel 202 supporting an upright cleaner for a prolonged period of time). For example, creep deformation can result in the rim 208 becoming uncentered relative to the hub 210 when the upright cleaner is stored for a prolonged period without movement. In these instances, the deformation limiter 218 can be configured to minimize the deformation such that the wheel 202 can remain functional. In other words, the separation distance 608 can be configured such that the inner surface 304 of the rim 208 comes into engagement (e.g., contact) with the deformation limiter 218 before the rim 208 becomes substantially uncentered relative to the hub 210.

As also shown, an outer surface 610 of the rim 208 can define a channel 612 that extends around the rim 208. The channel 612 can be configured to receive a traction band 614 extending therein. The traction band 614 can be configured to increase, for example, the traction between the wheel 202 and a surface to be cleaned. In some instances, the traction band 614 can be configured to deform in response to engaging an obstacle such that the traction band 614 absorbs at least at portion of the impact.

While the present disclosure has shown a wheel having five equally spaced spokes, other configurations are possible. For example, there may be fewer than five spokes or more than five spokes. In some instances, the spokes may not be equally spaced from each other. Further, while the present disclosure shows each of the spokes having substantially the same shape, other configurations are contemplated. For example, one or more of the spokes may have a shape that is different from at least one other spoke.

The rim 208, hub 210, and spokes 212 can be made of the same or different materials. For example, one or more of the rim 208, hub 210, and/or spokes 212 can be made of one or more of a plastic (e.g., polyethylene, polypropylene, acrylonitrile butadiene styrene, polylactic acid, and/or any other plastic), a metal (e.g., an aluminum alloy, an iron alloy, a steel alloy, a titanium alloy, and/or any other metal alloy), a rubber (e.g., natural and/or synthetic rubber), wood (e.g., oak, pine, maple, and/or any other wood), a composite, and/or any other material. In some instances, the rim 208, hub 210, and spokes 212 may be a monolithic body that is formed, for example, by casting, molding (e.g., injection molding, blow molding, compression molding, and/or any other form of molding), additive manufacturing, subtractive manufacturing, and/or other process of making a monolithic body. In other instances, the rim 208, hub 210, and spokes 212 may be formed separately and coupled together using, for example, one of more of adhesives, mechanical fasteners (e.g., one or more screws, bolts, and/or any other mechanical fastener), press-fits, and/or any other form of coupling.

In one aspect of the present disclosure there is provided a vacuum cleaner. The vacuum cleaner can include an upright section, a surface cleaning head coupled to the upright section, and at least one wheel coupled to the surface cleaning head. The at least one wheel can include a hub, a rim, and an absorber extending between the hub and the rim. The absorber can be configured to deform before the rim experiences substantial deformation. A deformation limiter can be provided that is configured to limit a deformation in the absorber.

In some instances, the absorber includes a plurality of spokes. In some instances, the spokes have an arcuate shape. In some instances, a radius of curvature of the spokes increases as the spokes extend around a rotation axis of the hub. In some instances, a width of the spokes decreases as the radius of curvature increases. In some instances, at least a portion of one or more of the spokes is substantially tangent with an inner surface of the rim. In some instances, at least a portion of one or more spokes extends beyond a peripheral edge of the rim. In some instances, the deformation limiter is configured to prevent substantial permanent deformation in the absorber.

In another aspect of the present disclosure there is provided a surface cleaning head for a vacuum cleaner. The surface cleaning head can include a plurality of wheels coupled to opposing sides of the surface cleaning head. The plurality of wheels can include a hub, a rim, and a plurality of spokes extending from the hub at a substantially perpendicular angle towards the rim. The plurality of spokes can be configured to deform before the rim experiences substantial deformation.

In some instances, the spokes have an arcuate shape. In some instances, a radius of curvature of the spokes increases as the spokes extend around a rotation axis of the hub. In some instances, a width of the spokes decreases as the radius of curvature increases. In some instances, at least a portion of one or more of the spokes is substantially tangent with an inner surface of the rim. In some instances, a deformation limiter can be configured to limit a deformation of the spokes. In some instances, the deformation limiter is configured to prevent substantial permanent deformation in the spokes.

In another aspect of the present disclosure there is provided a wheel for a vacuum cleaner. The wheel can include a hub, a rim configured to be displaced relative to the hub, and a plurality of spokes extending between the hub and the rim. At least a portion of one or more of the spokes may extend beyond a peripheral edge of the rim.

In some instances, the spokes have an arcuate shape. In some instances, a radius of curvature of the spokes increases as the spokes extend around a rotation axis of the hub. In some instances, a width of the spokes decreases as the radius of curvature increases. In some instances, at least a portion of one or more of the spokes is substantially tangent with an inner surface of the rim.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that a surface cleaning apparatus may embody any one or more of the features contained herein and that the features may be used in any particular combination or sub-combination. Modifications and substitutions by one of ordinary skill in the art are considered to be within the scope of the present invention, which is not to be limited except by the claims.

What is claimed is:

1. A surface cleaning head for a vacuum cleaner comprising:
    a main body; and
    a plurality of wheels coupled to opposing sides of the main body, the plurality of wheels including:
        a hub;
        a rim; and
        a plurality of spokes extending from the hub at a substantially perpendicular angle towards the rim, the plurality of spokes configured to deform before the rim experiences substantial deformation, wherein the main body includes a deformation limiter to limit a deformation of the plurality of spokes.

2. The surface cleaning head of claim 1, wherein the spokes have an arcuate shape.

3. The surface cleaning head of claim 2, wherein a radius of curvature of the spokes increases as the spokes extend around a rotation axis of the hub.

4. The surface cleaning head of claim 3, wherein a width of the spokes decreases as the radius of curvature increases.

5. The surface cleaning head of claim 3, wherein at least a portion of one or more of the spokes is substantially tangent with an inner surface of the rim.

6. The surface cleaning head of claim 1, wherein the deformation limiter is configured to prevent substantial permanent deformation in the spokes.

* * * * *